Aug. 2, 1955 O. H. SCHMITT 2,714,635

MODULATOR-THERMAL DEMODULATOR SYSTEM

Filed Aug. 7, 1944

INVENTOR
Otto H. Schmitt

BY O. H. Schmitt
Walter S. Paul.
ATTORNEYS

United States Patent Office 2,714,635

Patented Aug. 2, 1955

2,714,635

MODULATOR-THERMAL DEMODULATOR SYSTEM

Otto H. Schmitt, Port Washington, N. Y., assignor to the United States of America as represented by the Secretary of the Navy Application August 7, 1944, Serial No. 548,489

1 Claim. (Cl. 179—171)

This invention relates to improvements in demodulators, and more particularly in demodulators intended for use in systems where the modulation frequency is relatively low. Such demodulators are particularly adapted, for example, for use in demodulating the output signal from a magnetometer which is employed to indicate or measure changes in the ambient magnetic field due to the presence of a magnetic body. Such changes may be referred to as magnetic anomalies.

In systems of the type just referred to, components of output signal due to magnetic "noise" are very likely to be present in addition to the component due to the magnetic anomaly. It is highly desirable that the demodulator be capable of discriminating, at least to some extent, against such undesired output signals. This is especially the case where the frequency of the desired signal is so low that filtering by ordinary resistance-capacitance networks becomes impracticable, due to the large values of resistance and capacitance required to secure a sufficiently long time constant.

In accordance with the present invention, it is proposed to secure demodulation of a modulated carrier signal by means of thermistors, the thermal time constant of which is long compared with the period of the carrier frequency and short compared with the period of the modulation frequency. Depending upon the extent to which these two conditions are met, little or no additional filtering is required effectively to separate the desired signal component from carrier components. Furthermore, if the thermistors employed are of the type in which the heating phase is short compared with the period of the modulation frequency and the cooling phase considerably longer than the latter period, the system may be utilized as a device for retaining a signal of maximum value even after the signal recedes.

Figure 1:
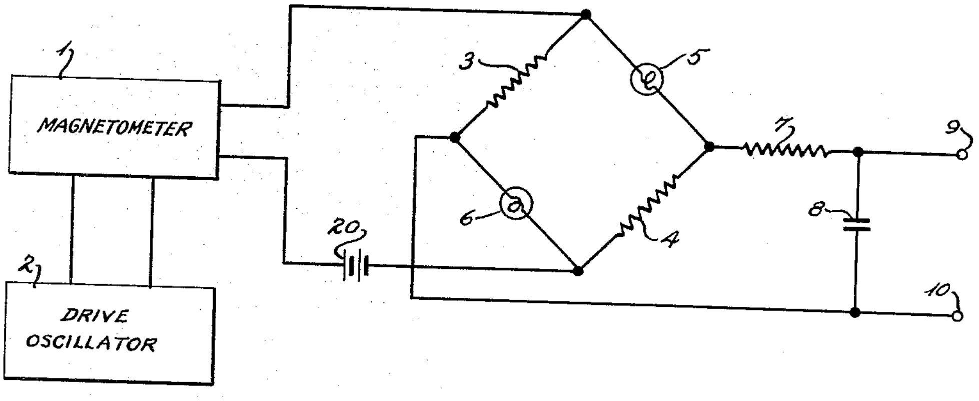
Figure 2:
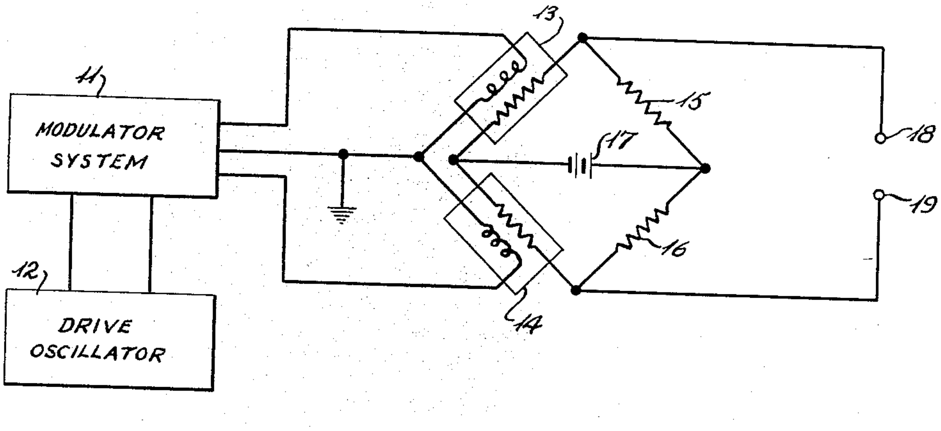

In the accompanying drawing, Fig. 1 is a diagram of a demodulator illustrative of one of the simpler forms of the invention; and Fig. 2 is a circuit diagram of a modified form of the invention comprising additional features.

Referring to Fig. 1 of the drawing, there is shown a modulation system 1 having a single-ended output circuit, associated with which is an oscillator 2. System 1 may, for example, be a magnetometer of the saturated-core type. The output of system 1 is connected to one diagonal of a Wheatstone bridge comprising resistors 3 and 4 and thermistors 5 and 6. In this embodiment of the invention, thermistors 5 and 6 may comprise miniature incandescent lamp bulbs, as for example flashlight bulbs. The other diagonal of the Wheatstone bridge is connected, through a filter network comprising series resistor 7 and shunt capacitor 8, to output terminals 9 and 10. Battery 20 supplies the necessay direct-current component.

In operation, oscillator 2 produces a carrier frequency, which may for example be 400 cycles per second, and this frequency is amplitude-modulated in system 1. When the modulated carrier frequency is applied to the Wheatstone bridge, thermistors 5 and 6, having resistance values which change rapidly with the applied voltage, function to produce continuous current at output terminals 9 and 10 varying with the modulation frequency but free of the carrier frequency. Due to the thermal inertia of thermistors 5 and 6, the demodulator is relatively insensitive to spurious modulation frequencies higher than the frequencies of the desired signal. The thermistors may be so proportioned that there will also be discrimination against very low-frequency spurious signals. This inherent tendency to discriminate against noise is supplemented by the action of the low-pass filter comprising resistor 7 and capacitor 8, so that the output voltage appearing between terminals 9 and 10 represents, almost entirely, the desired component of the signal.

Referring now to Fig. 2, there is shown modulator system 11 having a double-ended output circuit such that the carrier level on one side rises with modulation while that on the other side falls, with which is associated an oscillator 12. The output of system 11 supplies the heaters of a pair of heater-type thermistors 13 and 14, the resistance elements of which comprise two legs of a Wheatstone bridge. The other two legs of the bridge are formed by resistors 15 and 16. Battery 17 is connected across one diagonal as shown, the other diagonal being connected to output terminals 18 and 19.

In operation, one of the output voltages of modulation system 11 increases and the other decreases when modulation takes place. Such a change in the output voltages causes one of thermistors 13 and 14 to be increased in temperature, the temperature of the other correspondingly decreasing. This in turn varies the resistance of the thermistor elements and alters the proportion of the voltage of battery 17 which appears between terminals 18 and 19.

It will be understood that the large thermal inertia which is inherent in heater-type thermistors makes the demodulator of Fig. 2 substantially insensitive to carrier frequencies and to spurious noise signals of high frequency without appreciably affecting its response to desired signals of low frequency. As a matter of fact, the arrangement of Fig. 2 is so effective in this respect that no additional filter network is required to secure this discrimination.

By selecting for thermistors 13 and 14 devices which have a heating phase which is rapid compared with their cooling phase, the arrangement of Fig. 2 may be utilized to retain an output signal for an appreciable period following a maximum value in the input signal. This feature of the invention is particularly desirable in numerous applications.

What I claim is:

A modulator system having a double ended circuit and providing modulated alternate pulse signals in the two sides of said double ended circuit, the carrier level in one side rising with modulation while that in the other side is falling, a pair of heater-type thermistors each comprising a heat responsive variable resistance element and a heating element therefor, a Wheatstone bridge having a pair of input terminals and a pair of output terminals, a constant potential source connected between said pair of input terminals, each of said variable resistance elements comprising one leg of said Wheatstone bridge, and each of said heater elements being connected in one side respectively, of said double ended circuit.

References Cited in the file of this patent

UNITED STATES PATENTS

| | | |
|---|---|---|
| 756,718 | Shoemaker | Apr. 5, 1904 |
| 767,981 | Stone | Aug. 16, 1904 |
| 768,001 | Stone | Aug. 16, 1904 |
| 927,314 | Babcock | July 6, 1909 |
| 1,287,970 | Greinacher et al. | Dec. 17, 1918 |
| 2,173,918 | Schmid et al. | Sept. 26, 1939 |
| 2,300,593 | Perroux | Nov. 3, 1942 |
| 2,413,021 | Wolfson et al. | Dec. 24, 1946 |
| 2,431,307 | Chatterjea et al. | Nov. 25, 1947 |

FOREIGN PATENTS

| | | |
|---|---|---|
| 366,920 | Great Britain | Feb. 8, 1932 |